United States Patent

Kimura et al.

Patent Number: 4,755,955
Date of Patent: Jul. 5, 1988

[54] DOCUMENT CREATING APPARATUS

[75] Inventors: Kazuhiro Kimura, Yokohama; Kiyoshi Kikuchi, Ninomiya, both of Japan

[73] Assignee: Kabushiki Kaisha Toshiba, Kawasaki, Japan

[21] Appl. No.: 45,751

[22] Filed: Apr. 29, 1987

Related U.S. Application Data

[63] Continuation of Ser. No. 627,530, Jul. 3, 1984, abandoned.

[30] Foreign Application Priority Data

Jul. 6, 1983 [JP] Japan ................... 58-121508

[51] Int. Cl.⁴ .............. G06F 15/40; G06F 15/62; G09G 1/06; B41J 5/30
[52] U.S. Cl. .................. 364/518; 340/724; 340/751; 400/63; 400/110; 382/41; 364/521
[58] Field of Search ........... 340/724, 751, 723, 726; 364/200, 518, 519, 521, 523; 382/42, 48, 41; 400/3, 4, 5, 63, 83, 110

[56] References Cited

U.S. PATENT DOCUMENTS

| | | | |
|---|---|---|---|
| 3,568,178 | 3/1971 | Day | 340/724 |
| 3,668,685 | 6/1972 | Horvath | 340/724 X |
| 3,781,816 | 12/1973 | Coleman et al. | 364/200 |
| 3,812,945 | 5/1974 | Koplow et al. | 400/5 |
| 3,968,868 | 7/1976 | Greek, Jr. et al. | 400/63 |
| 4,078,249 | 3/1978 | Lelke et al. | 340/724 X |
| 4,440,513 | 4/1984 | Kataoka et al. | 400/83 X |
| 4,495,490 | 1/1985 | Hopper et al. | 340/723 X |
| 4,526,594 | 12/1985 | Bednar et al. | 382/48 X |
| 4,533,910 | 8/1985 | Sukonick et al. | 340/724 X |
| 4,542,376 | 9/1985 | Bass et al. | 340/724 |
| 4,549,275 | 10/1985 | Sukonick | 340/726 X |
| 4,573,199 | 2/1986 | Chen et al. | 340/751 X |
| 4,675,743 | 6/1987 | Riseman et al. | 358/263 |
| 4,677,571 | 6/1987 | Riseman et al. | 358/263 X |
| 4,700,317 | 10/1987 | Watanabe et al. | 364/521 X |

FOREIGN PATENT DOCUMENTS

0075744 4/1983 European Pat. Off.

OTHER PUBLICATIONS

Patents Abstracts of Japan, vol. 7, No. 93 (P-192) (1238), Apr. 19, 1983, & JP-A-5 818 779 (Canon) (03-02-1983).

*Primary Examiner*—Parshotam S. Lall
*Assistant Examiner*—Joseph L. Dixon
*Attorney, Agent, or Firm*—Oblon, Fisher, Spivak, McClelland & Maier

[57] ABSTRACT

A document creating apparatus allows the insertion of strings of characters within a display area of a boundary figure to have good balance. The display area of the strings of characters is compared with that of the boundary figure. The strings of characters are reduced or enlarged or the boundary figure is enlarged or reduced in accordance with the comparison result so as to display the strings of characters and the figure with good balance.

3 Claims, 10 Drawing Sheets

| 41 | 42 | 43 | 44 | 45 |
|---|---|---|---|---|
| 1 | CIRCLE | $\overline{O}$ (x,y)<br>R (x,y) | $\overline{O}$ (x,y) | BOUNDARY PRIORITY |
| 2 | POLYGON | E1 (x,y)<br>E2 (x,y)<br>E3 (x,y)<br>E4 (x,y)<br>E5 (x,y) | G (x,y) | CHARACTER STRING PRIORITY |
| ⋮ | ⋮ | ⋮ | ⋮ | ⋮ |

FIG. 9B (1, STRING1, n1)
(2, STRING2, n2)
⋮
($\ell$, STRING$\ell$, n$\ell$)
⋮
(L, STRINGL, nL)

FIG. 9C (1, STRING1, (Dx1, Dy1))
(2, STRING2, (Dx2, Dy2))
⋮
($\ell$, STRING$\ell$, (Dx$\ell$, Dy$\ell$))
⋮
(L, STRINGL, (DxL, DyL))

($\ell$, $n_\ell$)

DOCUMENT CREATING APPARATUS

This application is a continuation of application Ser. No. 627,530, filed on July 3, 1984, now abandoned.

BACKGROUND OF THE INVENTION

The present invention relates to a document creating apparatus for creating a document including both strings of characters and figures.

A document creating apparatus such as a word processor capable of creating a document including both characters and figures has been used. In such a conventional document creating apparatus, although the central position of the strings of characters to be inserted in a displayed figure largely affects the balance between the strings of characters and the figure, a means for achieving a good balance has not yet been proposed. Since character insertion areas are rectangular in most cases, a suitable relation between the boundary areas of various figures and strings of characters to be inserted could not established. For example, when strings of characters are inserted within a boundary area of a displayed figure with good balance, the operator moves a cursor on the screen to insert the strings of characters while comparing the shape, size and position of the figure with the number of characters, the number of lines, and the area of the strings of characters to be inserted. In view of the length time and the amount of labor requried, this process has imposed a great load on the operator editing a document.

SUMMARY OF THE INVENTION

It is an object of the present invention to provide a document creating apparatus which is capable of arranging with good balance a figure and strings of characters to be inserted therein on a display screen.

According to the present invention, when strings of characters are to be inserted with good balance within a boundary area of a figure displayed on a display screen, an area for displaying the strings of characters and a boundary area of the figure are compared with each other. In accordance with the comparison result obtained, the area of the strings of characters is enlarged or reduced and the area of the figure is reduced or enlarged to display the characters in the figure with good balance.

Further, the center of the boundary area of the figure is determined for displaying the strings of characters with good balance. The strings of characters are then arranged such that the area of characters is vertically and horizontally symmetrical, and that the mid point of the symmetrical axis and the center of the figure coincide with each other.

DETAILED DESCRIPTION OF THE PREFERRED EMBODIMENT

Figure 1:
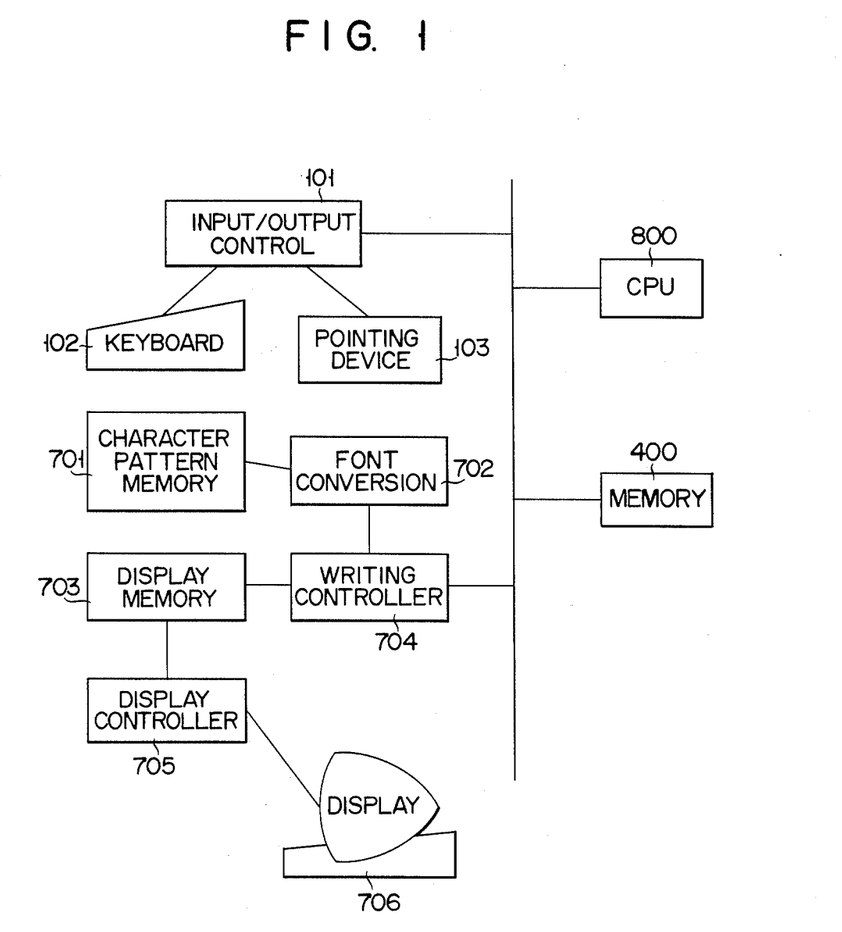
FIG. 1 is a hardware block diagram of a document creating apparatus according to the present invention.

FIG. 1 is a block diagram of hardware components used in a document creating apparatus according to the present invention. An input interface with an operator, that is, a keyboard 102 and a pointing device 103 are controlled by an input/output control processor 101. An output interface is a display device 706 controlled by a writing controller 704. The writing controller 704 writes a display image in a display memory 703, and fetches a character pattern stored in a character pattern memory 701 through a font conversion device 702. A display controller 705 maps the image on the display memory 703 on the display device 706.

A central processor unit (CPU) 800 stores and converts information from the input components and provides display outputs to the output components. The CPU 800 operates in accordance with an algorithm to be described later. A memory 400 stores a control program for controlling the operation of CPU 800.

Figure 2:
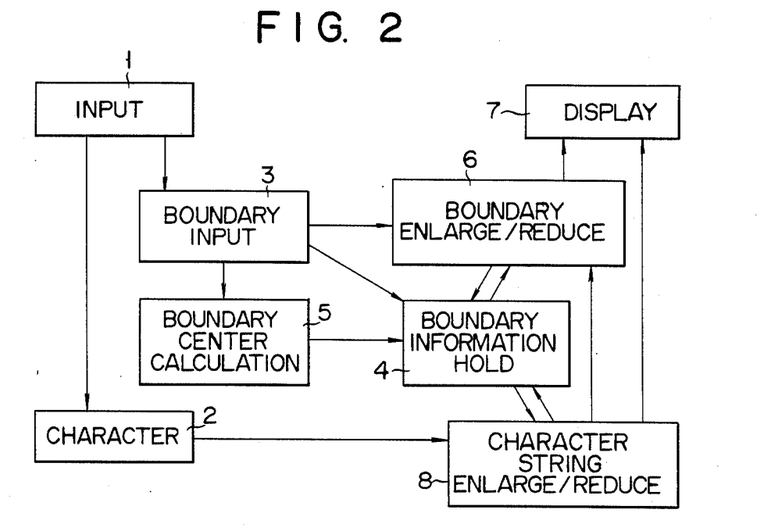
FIG. 2 is a functional block diagram of the document creating apparatus according to the present invention.

The configuration of the document creating apparatus according to the present invention will now be described with reference to FIG. 2.

Figure 3:
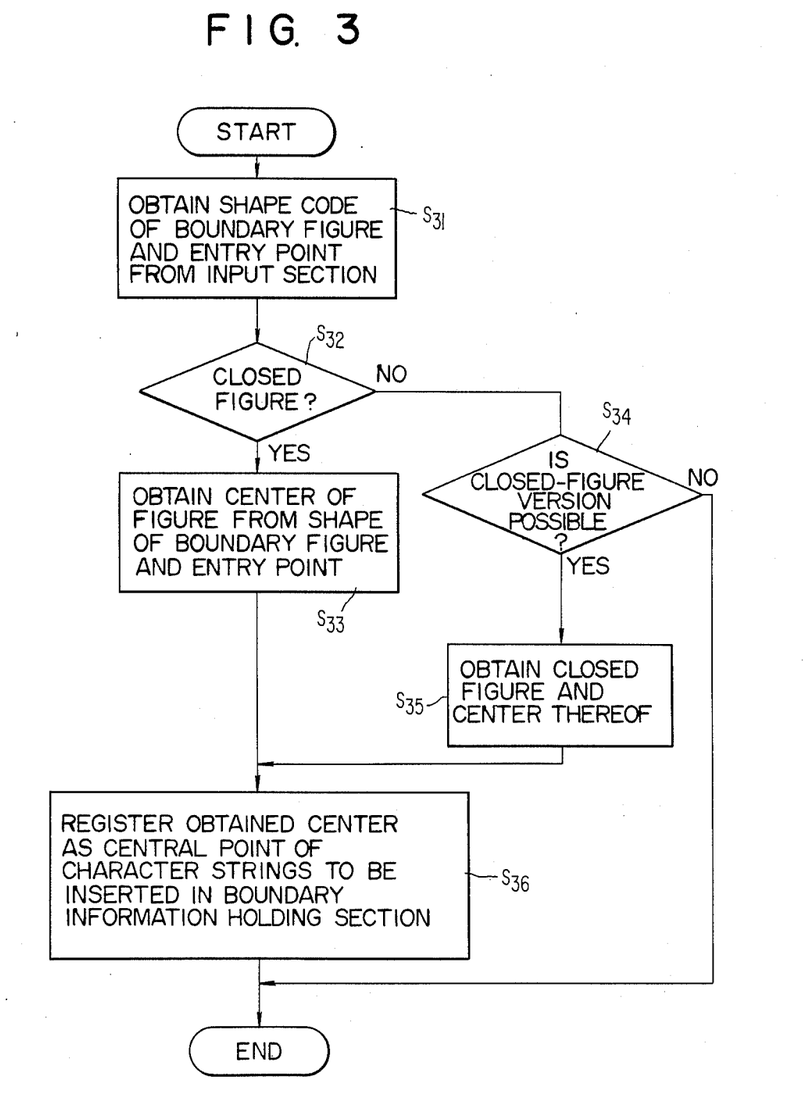
FIG. 3 is a flow chart for calculating the center of the figure.
Figure 4:
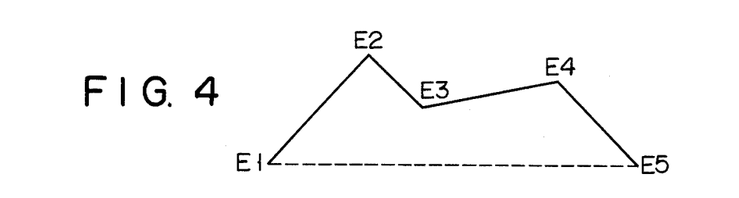
FIG. 4 shows an example of an open figure.

An input section 1 receives code and position coordinate information of characters and figures from a keyboard and a tablet. The input section 1 consists of the input/output control processor 101, the keyboard 102, and the pointing device 103 of FIG. 1. Information from the input section 1 is transferred to a character string input section 2 and a boundary input section 3. The character string input section 2 receives the character codes of characters and position coordinates for inserting the strings of characters from the input section 1. The boundary input section 3 stores code data representing the shape of the figure and position coordinate data (to be referred to "boundary area data" hereafter) representing the position and size of the figure supplied from the input section 1 in a boundary information holding section 4 and also drives a boundary center calculation section 5 and a boundary enlarge/reduce section 6. The boundary center calculation section 5 calculates a character insertion central point peculiar to a boundary area from the boundary area data supplied from the boundary input section 3. In this embodiment, the character insertion central point is defined as the center of the boundary figure. The boundary center calculation section 5 calculates the center of the boundary figure in accordance with an algorithm shown in FIG. 3. Referring to FIG. 3, a shape code represents information of the shape of a boundary figure. Codes representing a circle, a polygon, an arc and the like are determined. The entry points represent position coordinates of a string of points necessary for determining the position and size of the boundary figure. For example, in the case of a circle, the entry point indicates position coordinates of the center and a point on the circumference of the circle. In the case of a polygon, the entry points corresponds to position coordinates of the vertexes. Therefore, if a designated boundary figure is a closed figure, which is frequently used, the center of the boundary figure can be easily calculated from the shape code and the entry points (steps 532 and 533). If a designated boundary figure is an open figure of a relatively simple shape as in the case shown in FIG. 4, it may be regarded as a closed figure by connecting points E1 and E2 to determine the center of the figure (steps 534 and 535).

Figure 5:
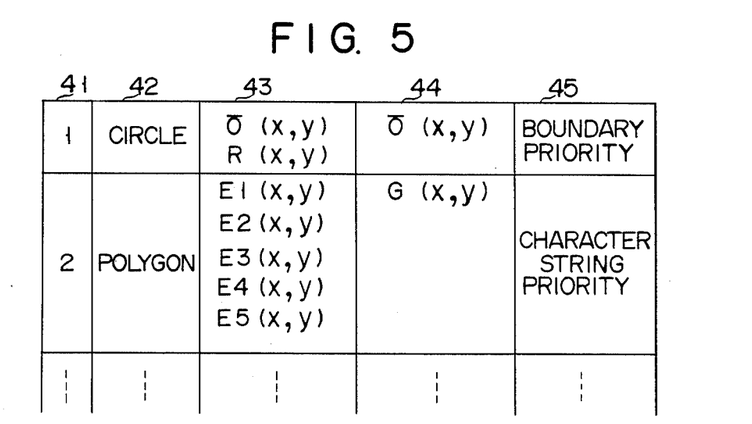
FIG. 5 shows the data format of a boundary information holding section.

The position coordinates of the character insertion central point, obtained by the boundary center calculation section 5, are written in the boundary information holding section 4 (step 536). The holding section 4 corresponds to the memory 400 shown in FIG. 1. As shown in FIG. 5, the boundary information holding section 4 comprises a table consisting of identification numbers 41, shape codes 42 of boundary figures, position coordinates 43 of entry points, position coordinates 44 of the character insertion central points, and priority flags 45. The priority flag 45 is supplied from the boundary input section 3 when inputting a boundary figure and provides a priority to the boundary figure or the characters when a contradiction occurs between the size of the designated boundary figure and the area occupied by the applied character strings. A case wherein the size of the boundary figure is given a priority will now be considered. When a string of a designated number of characters (e.g., 6) of a given size are to be inserted in a designated figure (circle), as in the case shown in FIG. 6A, the characters protrude from the boundary figure. In such a case, the character size is reduced to enable them to be fitted inside the boundary figure, as shown in FIG. 6B. Alternatively, when the size of the characters is extremely small as compared to that of the boundary figure, the characters are enlarged to match the boundary figure. On the other hand, in the case of the character-string priority, the boundary figure is enlarged or reduced to match the occupied area of characters.

The boundary enlarge/reduce section 6 is a driver for displaying on a display section 7 the boundary figure information supplied from the boundary input section 3. Furthermore, in accordance with a command from a character string enlarge/reduce section 8 to be described later, the boundary enlarge/reduce section 6 rewrites the entry point 43 from the boundary information holding section 4 to enlarged/reduced position coordinates, thereby displaying the enlarged/reduced boundary figure on the display section 7.

A means for inputting strings of characters within the boudary figure will now be described. The strings of character codes received by the character string input section 2 from the input section 1 comprise character codes of kanas (Japanese letters) or alphanumerical symbols, return codes and character string end codes. If required, the character string input section 2 performs a character code conversion (e.g., kana-kanji conversion) and transfers the converted character code strings to the character string enlarge/reduce section 8.

Figure 7:
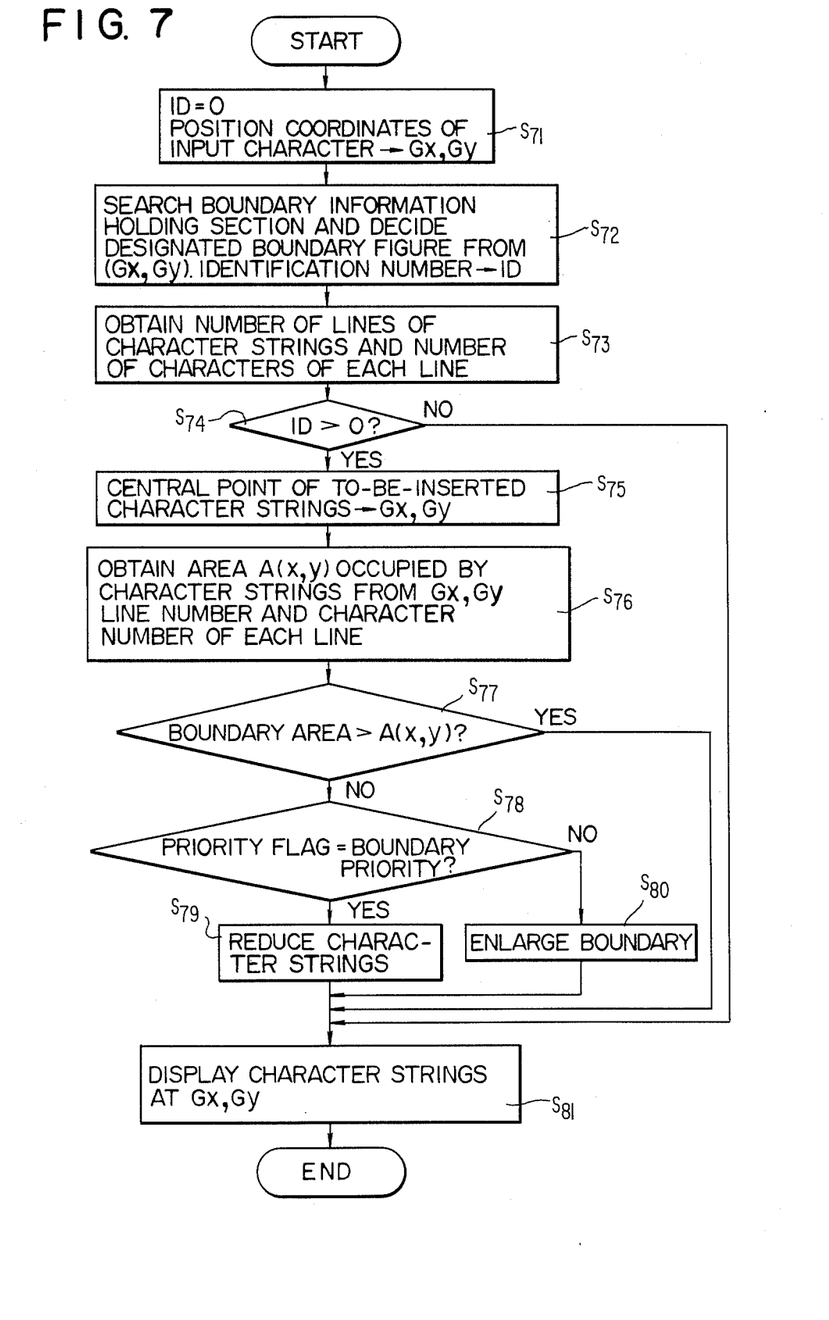
FIG. 7 is a flow chart for reducing or enlarging the strings of characters.

The character string enlarge/reduce section 8 operates basically in accordance with an algorithm shown in FIG. 7. Referring to FIG. 7, reference symbol ID is a variable held as an identification number, representing which one of the areas stored in the boundary information holding section 4 corresponds to the position coordinates for inserting the designated character strings.

Figure 8A:
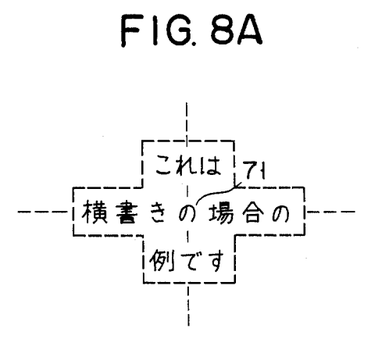
FIGS. 8A and 8B are representations showing examples of areas occupied by strings of characters.
Figure 8B:
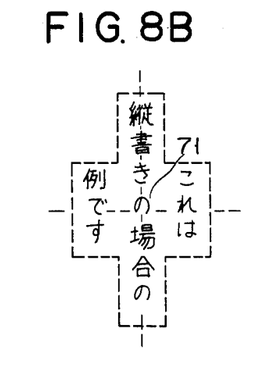

When there is no such area in the section 4, ID=0 is held, and the character strings are directly displayed at the designated position coordinates. FIG. 8 shows an example of such a character string display. In this embodiment, when it is described that strings of characters are displayed at a point of coordinates (GX, GY) (71), it means that the strings of characters are arranged such that they are horizontally symmetrical (if the strings are written horizontally as in FIG. 8A) or vertically symmetrical (if the strings are written vertically as in FIG. 8B), and the middle point of the symmetrical axis coincides with the point of coordinates (GX, GY) (71).

Figure 9A:
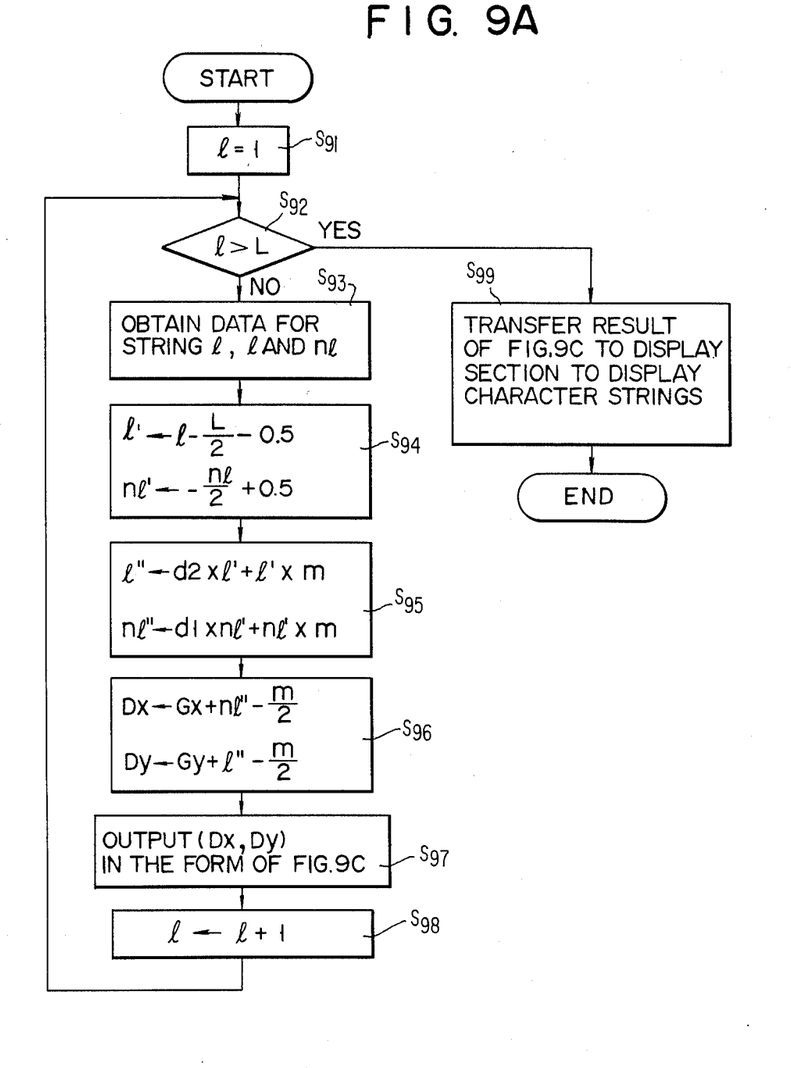
FIG. 9A is a basic flow chart for inserting strings of characters.
Figure 9B:
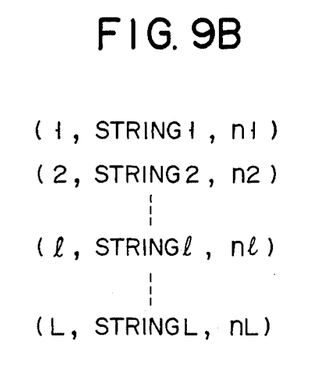
FIGS. 9B and 9C show data tables for inserting strings of characters.
Figure 9C:
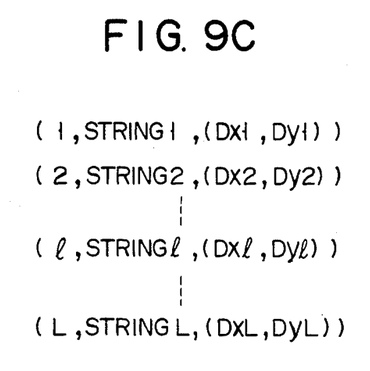
Figure 9D:
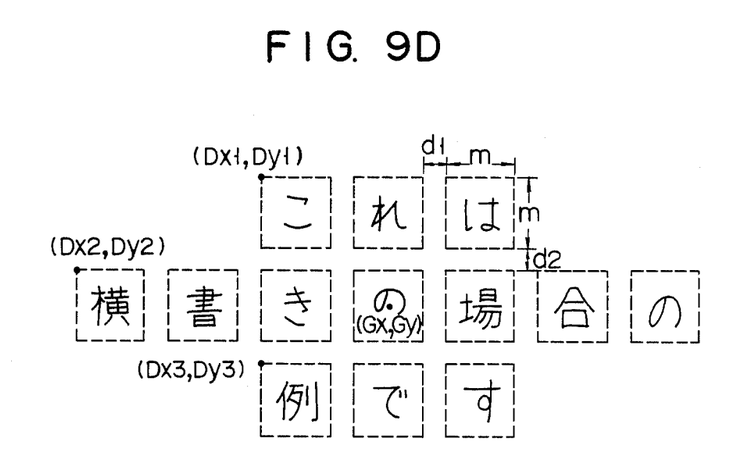
FIG. 9D is a representation showing an arrangement of strings of characters.

FIG. 9A shows an algorithm for a character string arrangement when no boundary area is present. This algorithm is for inserting strings of characters to be horizontally symmetrical, as shown in FIG. 8A. In this case, display start coordinates (DX, DY) of each line are calculated, as shown in FIG. 9D, in accordance with data (FIG. 9B) on the number of lines of strings of characters to be inserted and the number of characters of each line obtained by the operation shown in FIG. 7, the coordinates (GX, GY) of the character string insertion central point, and data of a character size m×m, an inter-character spacing d1, and an inter-line spacing d2 held in a separate system. The calculated coordinates are stored as shown in FIG. 9C. Note that the values of the character size m×m, the inter-character spacing d1, the inter-line spacing d2, and the display start coordinates (DX, DY) are calculated in the same coordinate system as that of the coordinates (GX, GY). The display start coordinates (DX, DY) are coordinates of a point at the upper left corner of the first character of each line, as shown in FIG. 9D. Referring to FIG. 9B, reference symbol l denotes a value designating a line; STRING l denotes strings of characters of the l-th line; nl denotes the number of characters of the l-th line; and L denotes the total number of lines of the strings of characters to be inserted.

Figure 10:
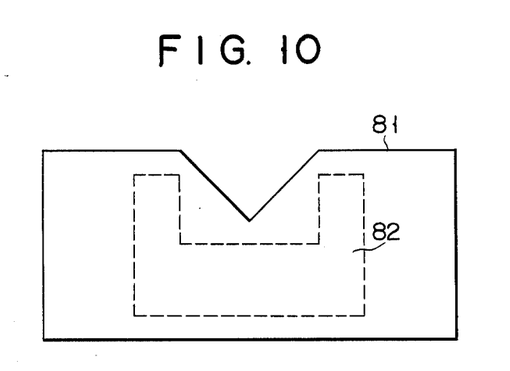
FIG. 10 shows a boundary figure and an area occupied by strings of characters.

On the other hand, when a boundary area is present in the section 4 (ID>0), the relation between the boundary area and the area occupied by the strings of characters must be checked. FIG. 7 shows the simplest algorithm for achieving this. According to FIG. 7, it is checked is an area A(x, y) occupied by the strings of characters as shown in FIG. 8A is included or not in the boundary area. Reduction of the strings of characters or enlargement of the boundary figure is performed in accordance with the comparison result obtained. Other algorithms can, of course, be adopted including an algorithm for determining the area A(x, y) (82) occupied by the strings of characters relative to a boundary area 81 having a recess, as shown in FIG. 10, or an algorithm for enlarging the character string area or reducing the boundary area so as to balance them.

Each of steps in the algorithm will be described with reference to FIG. 7. In step S71, an initial value "0" is set at variable ID. The position coordinates for inserting the character strings, which are designated through pointing device 103 or keyboard 102 by an operator, are set at variables GX, GY. In step S72, boundary information holding section 4 is searched based on variables GX, GY to obtain a boundary figure in the vicinity of the coordinates (GX, GY), and its identification number is set at variable ID. If the boundary figure is not obtained in the vicinity of the coordinates (GX, GY), the initial value "0" of variable ID is held. In step S73, the character string is divided, as shown in FIG. 9B, on the basis of a terminal symbol (CR/LF) of each line to calculate the number of lines L of the character strings, a character string STRING 1 of each line, and the number of characters nl of each line. In step S74, control of the character strings is changed in accordance with variable ID obtained in step S72. If ID>0, that is, if a boundary figure is present in the vicinity of the position coordinates for inserting the character strings, the processings subsequent to step S75 are executed. If ID=0, the processing ends with step S81. In step S75, character insertion central points 44, which correspond to the values of ID, are obtained from boundary information holding section 4 and the values are set at variables GX, GY. The coordinates (GX, GY) correspond to a central point when the character strings are arranged. In step S76, when the character strings are aranged with the coordinates (GX, GY) positioned at the center, an area A(x, y) occupied by the character strings is calculated from the number of lines L of the character strings, the number of characters nl of each line, character size m, inter-character spacing d1, and inter-line spacing d2. In step S77, an inclusion relation between the area A(x, y) and a boundary area is checked. If the boundary area includes the area A(x, y), the processing ends with step S81. If not so, the processings subsequent to step S78 are executed. In step S78, it is detected whether or not priority flag 45 held in boundary information holding section 4 is a boundary priority. If it is a boundary priority, the processing of step S79 is carried out. In step S79, the character strings are reduced until the area A(x, y) is included in-the boundary area. The data of character size m, inter-character spacing d1, and inter-line spacing d2, which has been held so far, is changed to new data. In step S78, when it is detected that priority flage 45 is a character string priority, step S80 is processed. In step S80, the boundary figure is enlarged until the are A(x, y) is completely included in the boundary area. The data of entry point 43 of the boundary figure, which has been held so far, is changed to new one. In step S81, the character strings are displayed with the coodinates (GX, GY) positioned at the center. The algorithm for displaying character strings is detailed in FIG. 9A.

The algorithm for character string display will be described with reference to FIG. 9A. To display the character strings centered at the coordinates (GX, GY), display start coordinates (DXl, DYl) of each line of the character strings are obtained. In step S91, an inital value "1" is set at variable l for recognizing lines. In step S92, the value of variable l and the total number of lines L (which are calculated in step S73) of the character strings are compared. If l>L, the calculation of display start coordinates (DXl, DYl) is completed and a display processing in step S99 is executed. If not so, the calculating operations of steps S93 and S97 are repeated until l>L is achieved. Step S98 aims at incrementing variable l. Steps S93 to S97 aim at calculating the display start coordinates (DXl, DYl) of the character string of the l-th line, that is, the coordinates of the upper left corner of the first character of the character string of the l-th line. In step S93, the number of characters nl of character string of the l-th line, and the character string STRONG l are obtained. This is achieved by referring to the data of FIG. 9B which is obtained in step S73. Step S94 is performed to calculate nl' representing a distance, in terms of the number of characters, between the center of the first character of the character string of the l-th line and that of the character string, and l' representing a distance, in terms of the number of lines, between them. For instance, when the number of lines is three, the first line is counted as plus 1 from the center and when the number of lines is two, the first line is counted as plus 0.5 from the center. The same is true of the number of characters. In step S95, a distance between the center of the first character of character string of the l-th line and that of the character string is calculated by multiplying a length of one character (d1+m) and that of one line (d2+m) by nl' and l', respectively. Namely, if a position vector of the center of the first character of character string of the l-th line is and that of the center of the character string is $G$, a vector (nl'', l'') is represented by "$\mathcal{D}$-$\mathcal{G}$". As shown in step S96, the display start coordinates (DX, DY) are obtained by adding a vector (−m/2, −m/2), which is from the center of the first character to the upper left corner of the character, to the position vector D. That is, (DX, DY) = +(nl'', l'')+(−m/2, −m/2). Of course, G=(GX, GY) is obtained in step S71 or step S75. In step S97, data of the coordinates (DX, DY) obtained in step S96 is output in the form of the l-th line shown in FIG. 9C.

With the configuration and algorithms described above, a boundary figure can be arbitrarily defined, and strings of characters can be arranged inside the boundary figure to have good balance.

In the document creating apparatus of the present invention, when creating figures, each closed area can be registered as a boundary figure in the boundary information holding section 4. In the embodiment described above, the character string insertion central point is handled as the center of the figure. However, depending upon the shape of the figure involved, the center of the figure may not necessarily be a suitable center for inserting the strings of characters. Accordingly, another calculating method of direct designating method by the user may therefore be adopted.

When strings of characters are input inside a boundary figure, an automatic return of the character string can be performed even if such a return is not specifically commanded by the user.

Figure 6A:
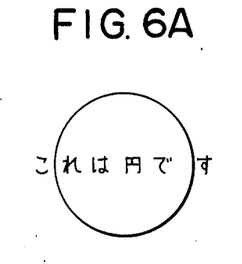
FIGS. 6A and 6B are representations for explaining a priority flag.
Figure 6B:
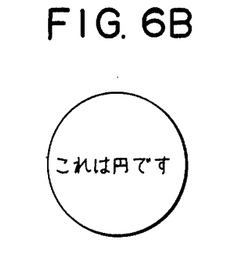
Figure 11A:
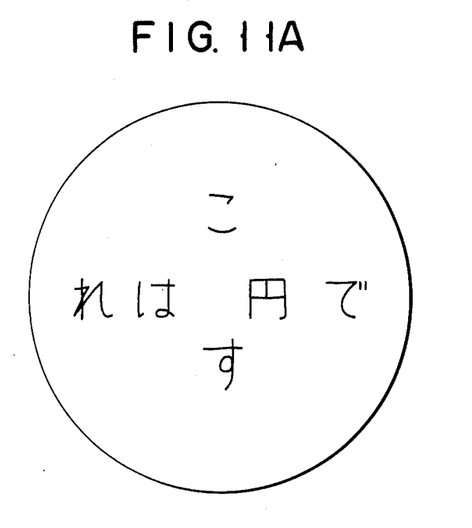
FIGS. 11A and 11B show the automatic return of strings of characters to be inserted.
Figure 11B:
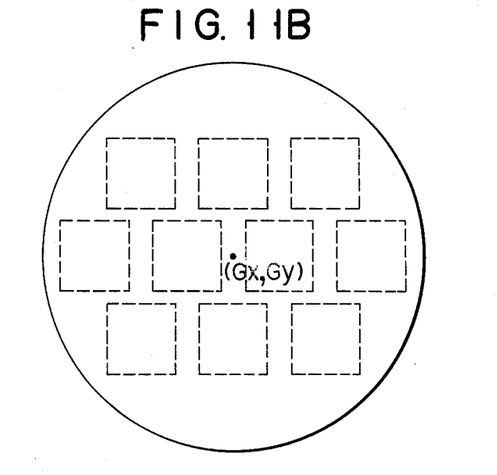
Figure 12:
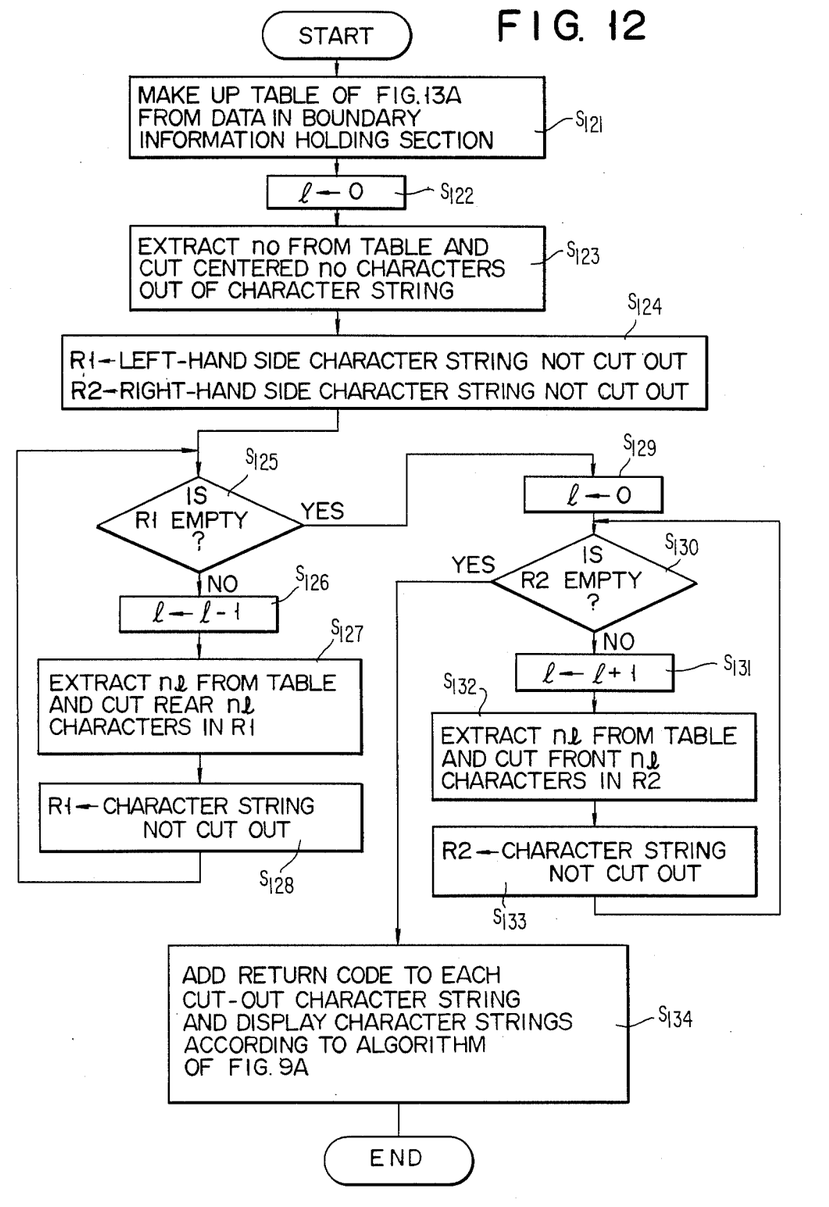
FIG. 12 is a flow chart for performing an automatic return of strings of characters to be inserted.
Figure 13A:
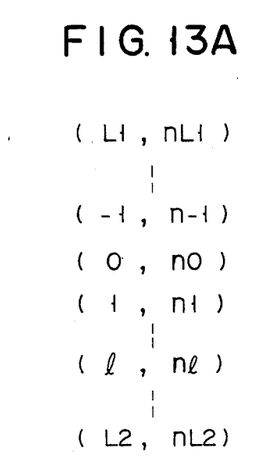
FIGS. 13A and 13B show data tables for performing an automatic return of character strings to be inserted.
Figure 13B:
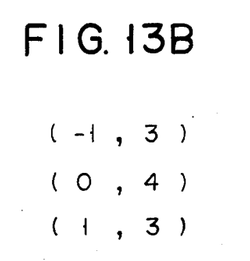

With such an automatic return arrangement, the character string shown in FIG. 6A is displayed as shown in FIG. 11A. FIG. 12 shows a simple algorithm for performing this function. Referring to FIG. 12, an area for inserting the character string is calculated from the data held in the boundary information holding section 4, and a table, as shown in FIG. 13A, is prepared. Then, a string of characters to be displayed on each line in the area is determined in accordance with the table. Referring to FIG. 13A, when the line including the character string central point is defined as line 0, the maximum number of characters arranged at the l-th line without protruding from the boundary area is represented by nl. For example, in the case of a boundary figure shown in FIG. 11, a table as shown in FIG. 13B is obtained.

Referring to FIG. 12, the algorithm of the automatic return arrangement will be explained. In step S121, a table of (l, nl) shown in FIG. 13A is made up from data in boundary information holding section 4. In step S122, an initial value "0" is set at variable l indicative of a line number. In step S123, the maximum total number (no) of characters arranged at the Oth line is calculated to cut no characters from the center portion of the character string. In step S124, the left-hand side character string and the right-hand side character string, with respect to the character string cut out in step S123, are set at character string variables R1 and R2, respectively. Variables R1 and R2 correspond to the character strings arranged at the upper side and the lower side of the character string which are cut out in step S123. Steps S125 to S128 aim at the processing for arranging R1 at the upper side, and Steps S129 to 133 aim at the processing for arrangement of R2 at the lower side. In step 125, it is detected whether R1 is empty or not. If R1 is empty, the arrangement at the upper side is completed and the processings subsequent to step S129 are executed. If not so, the processings of steps S126 to S128 are repeated.

What is claimed is:

1. A document creating apparatus comprising:
   input means for inputting character information representing characters, character input position coordinate information representing position coordinates of the characters, and boundary figure information representing a boundary figure;
   display means for displaying the characters and the boundary figure on the basis of the character information and the boundary figure information inputed from said input means;
   calculating means for calculating the center of the boundary figure on the boundary figure information, the number of lines of the character strings within a display area of the boundary figure, and the number of characters which can be arranged on each of the lines within a display area of the boundary figure, and for obtaining a string of characters to be displayed on each line in the boundary figure in accordance with the calculation results;
   boundary figure information holding means for storing position coordinate information on the center of the boundary figure obtained by said calculating means and the boundary figure information;
   said display means being responsive to said calculating means and said boundary figure information holding means to display the strings of characters and the boundary figure such that the mid point of a central string of characters among the strings of characters to be displayed is positioned at the center of the boundary figure.

2. An apparatus according to claim 1, wherein the boundary figure is a polygon.

3. An apparatus according to claim 1, wherein the boundary figure is a circle.

* * * * *